United States Patent Office 3,219,728
Patented Nov. 23, 1965

3,219,728
PROCESS OF MIXING POLYETHYLENE WITH HYDROCARBON WAXES, AND PRODUCT THEREOF
George G. Joris, Madison, and William L. Reiner, Lake Hiawatha, N.J., assignors to Allied Chemical Corporation, a corporation of New York
No Drawing. Filed Apr. 22, 1958, Ser. No. 730,045
5 Claims. (Cl. 260—897)

This invention relates to a process of incorporating in a high molecular weight, difficultly extrudable polyethylene a normally solid alkane hydrocarbon, which alkane is fusible and relatively fluid at and above its fusion temperature, whereby polyethylene compositions are provided which extrude much more readily than the original polyethylene and which are capable of forming homogeneous blends with good mechanical properties upon extrusion through a screw extruder, e.g. in the form of pipe.

This invention relates further to a specific polyethylene composition, namely a homogeneous blend of 2 polyethylenes, one being high density polyethylene of specific gravity at least 0.94 and melt index not above 0.1; and the other being polyethylene wax of specific gravity about 0.92, Staudinger molecular weight in the range 1500–5000, melting point in the range 97° C.–106° C., hardness in the range 0.1–0.5 mm. of penetration, and melt viscosity at 140° C. in the range 1.0–25 poises, said polyethylene wax component being present in amounts of about 10–25 parts by weight per 75 parts by weight of said high density polyethylene component. Any other hydrocarbon material present will not exceed about 10 parts by weight. Conventional pigments, fillers, antioxidants, etc. can be added in amounts which ordinarily will not exceed about 20% of the total weight. The final composition has abnormally high specific gravity, at least 0.005 unit above that calculated from the specific gravities of the components.

It is known that molten polyethylenes vary in extrudability; one quantity used to express these variations is the melt index. A standard method of the American Society for Testing Materials, ASTM method D1238–52T, for measuring melt index defines the term "melt index" as used herein. This test was performed in a F. F. Slocomb Corp. testing machine at 190° C. extrusion temperature using a 2160 gram weight.

The blending of extrudable polyethylenes having low melt index with normally solid alkanes, fusible and relatively fluid above their fusion temperatures, is broadly known. In particular, it has been proposed to blend polyethylenes having relatively low melt index with polyethylenes having a melt index at least 100,000 fold higher than that of the first group, whereby a blend having generally intermediate properties and reduced power requirement for extrusion at high shear is obtained. Methods proposed for forming these blends include milling, kneading and the like on hot rolls. These methods are laborious or impossible to apply when a preponderating ingredient of the blend is to be a high molecular weight polyethylene which is practically inextrudable under normal conditions, i.e. a polyethylene of molecular weight at least 500,000 by the Ivan Harris formula and having melt index not above 0.1. The Ivan Harris formula for molecular weight is given in the Journal of Polymer Science, vol. VIII, No. 4 (1952), pages 358–361, at page 360: $n=1.35\times10^{-4}$ $M^{0.63}$ where $n$ is intrinsic viscosity and M is molecular weight.

Blends obtained in accordance with the process of this invention contain these high molecular weight polyethylenes of very low melt index as one component together with a waxy polyethylene or other alkane hydrocarbon as the other essential component, specifically a normally solid fusible alkane having melt viscosity not above about 100 poises at 140° C., present in amounts between about 10 parts and about 50 parts by weight per 100 parts by weight of the high molecular weight polyethylene component. The specific composition which is the subject of this invention contains said high molecular weight, low melt index polyethylene and a low molecular weight polyethylene of the characteristics above set out, more especially as shown in the below Example 1; each in the specific proportions above set out.

In accordance with this invention it is possible to form very simply a composition of the above hydrocarbon components (high molecular weight polyethylene and lower molecular weight alkane) which composition becomes a homogeneous blend upon being extruded through a screw extruder. The present process depends in part upon the fact that alkanes which are relatively fluid at temperatures such as 100° C.–130° C. are inert at these temperatures to high molecular weight polyethylenes of very low melt index, i.e. the alkanes have practically no solvent or swelling action on these polyethylenes; whereas at sufficiently higher temperatures at which the polyethylene fuses, an intimate mixture thereof with said alkanes forms a homogeneous blend under the action of a standard screw type extruder.

The process of this invention comprises stirring said high molecular weight polyethylene of low melt index in powder form together with said alkane in fused form at temperatures no higher than the temperature at which the finished mixture first visibly changes from powdery to lumpy; and more specifically at temperatures in the range 100° C.–130° C.; using about 10–50 parts by weight of said fused alkane per 100 parts by weight of the total quantity of high molecular weight polyethylene powder. The stirring is continued until the polyethylene powder is intimately mixed with the fused alkane and has taken up substantially all of the fused alkane between and upon the polymer particles. The resulting composition remains powdery or readily friable to a powder when allowed to cool. When this composition is worked as a melt in a screw extruder at temperatures of about 180° C. and up, the composition forms of homogeneous blend which is much more easily extruded than the original polyethylene component and which can be extruded to form pipes and the like through an internally and externally cooled die at temperatures such as 200°–350° C. and pressures such as 2000–4000 p.s.i.

The resulting composition can be used for extrusion and like purposes in powder form, pelleted form, etc. Ingredients such as pigments, e.g., carbon black, and fillers, e.g. asbestos, can be included in the compositions. The following examples illustrate this invention but the invention is not to be considered as limited to all details of the examples.

EXAMPLE 1

As one component there was used 20 parts by weight of a polyethylene wax of the type described in Erchak U.S.P. 2,712,534 of July 5, 1955, having specific gravity of about 0.92; molecular weight in the range between about 1500 and about 3000 as defined by the Staudinger formula cited in said patent; melting point in the range 97–120° C. by ASTM method D–87; penetration hardness in the range 0.3–0.5 mm., measured by needle penetration in millimeters under a 200 gram weight for 5 seconds at 25° C.; and melt viscosity at 140° C. of about 1.5–2.5 poises This polyethylene wax was melted together with 5 parts of paraffin wax in a steam jacketed kettle heated to 250° F. (121° C.); and to the melt was added 0.5 parts of pigment carbon black and 0.5 part of organic antioxidant of the octylated diphenylamine type. Then a high molecular weight polyethylene of specific gravity about 0.95 and very low melt index, below 0.1, was stirred into the melt in powder form, in amount totaling 75 parts by weight of polyethylene powder. This polyethylene had molecular weight of the order of one million and was practically not extrudable at temperatures such as 200°–350° C. and pressure such as 2000–4000 p.s.i.

The mixing was continued for about 1–2 hours until the high molecular weight polyethylene powder was intimately mixed with the other ingredients. The resulting powder was uniformly colored by the carbon black and had taken up all of the fused wax between and upon the polymer particles. When this composition was allowed to cool it retained essentially the form of a powder, i.e. any lumps were very readily friable to a powder.

The melt index of the resulting composition was still below 0.1 but the composition was now extrudable under practical conditions as follows. The powder was pelleted and supplied to a screw extruder having a die for 2 inch pipe with water cooled jacket and water cooled central mandrel. This extruder was operated at 400°–425° F. (205°–220° C.) with the external cooling water at 190° F. (88° C.), and the internal cooling water at about 50° F. (10° C.) and flowing at about $\frac{1}{10}$ U.S. gallon per minute. The screw speed was 15 r.p.m., the extrusion pressure was 3400 p.s.i, and the throughput was 9 inches per minute of 2 inch pipe of standard wall thickness ($\frac{3}{16}$ inch). The success of the composition of this invention in producing superior pipe can be seen from the comparison below of bursting pressures in lbs./sq. in. for the pipe produced as above versus minimum standards set by the Society of the Plastics Industry for Standard 2 inch polyethylene pipe at temperatures which, if anything, are lower than the test temperatures below.

Minimum standard
  burst pressure:
    At 73.4° F.–188 p.s.i.
    At 120° F.–50% of the 73.4° F. value Burst pressure
  of above pipe:
    At 82° F.–260 p.s.i.
    At 127° F.–190 p.s.i.

The surprising plasticizing effect of the specific low density polyethylene wax upon the high density, low melt index polyethylene may be connected with the surprising observation that the blend as above produced had higher specific gravity (about 0.965) than calculated from the values for the components (about 0.945). This abnormally high density of the blend indicates a high level of compatibility of the components, and gives assurance of complete homogeneity of the blend of polyethylenes and wax.

EXAMPLE 2

A blend was made by the same procedure used in Example 1 except that all of the 25 parts of low molecular weight hydrocarbon was paraffin wax, i.e. 20 parts by weight of paraffin wax was substituted for the 20 parts by weight of polyethylene wax of Example 1. A homogeneous blend resulted. This blend could be compression molded into tiles with excellent properties of impact strength, abrasion resistance, tensile strength, etc. These desirable properties were retained practically unimpaired when about 17 parts of asbestos filler were added to such blend, giving a composition of about 62 parts high density polyethylene, 21 parts paraffin wax, 17 parts asbestos.

EXAMPLE 3

A blend was made by the procedure of Example 1, using the following ingredients in parts by weight: 76 parts—polyethylene generally as in Example 1 of melt index below 0.1, having specific gravity about 0.95 and Ivan Harris molecular weight about 2 million; 21.5 parts—polyethylene of melt viscosity at 140° C. about 1.8 poises, specific gravity about 0.92, as in Example 1; 2.5 parts—pigment grade carbon black; 0.025 part—antioxidant (sym. di-beta-naphthyl-para-phenylene diamine).

The powder resulting from the mixing and cooling operation described in Example 1 was pelleted and fed to a screw extruder equipped with a die for production of 2 inch diameter pipe. Although the melt index of the composition remained not above 0.1, nevertheless the composition was now extrudable at temperatures in the range 550°–600° F. (about 290° C.–320° C.) and pressures in the range 2500–3500 p.s.i.g. at rates ranging depending on intensity of cooling, degree of lubrication, etc. between about 8 inches per minute and about 20 inches per minute.

The resulting pipe retained the excellent properties associated with the high molecular weight polyethylene component (e.g. in compression molded forms thereof), in particular having stress crack resistance measured in months rather than hours; having hoop burst stress (Barlow formula) of at least 3000 p.s.i. at 70° F. and 100 p.s.i. minimum pressure rise per minute; and being flexible so that it can be coiled for convenient handling.

The specific gravity of the blend including the added carbon black and antioxidant has calculated value of 0.955; the measured value for the pipe is about 0.960, which value will be slightly higher if measured on an annealed sample in accordance with the standard procedure.

The above composition wherein the high density polyethylene component has specifically a molecular weight by the Ivan Harris formula (Journal of Polymer Science, vol. 8 of 1952, page 360) of the order of 1 million and a specific gravity of about .94–.95, producing final specific gravity of at least about .940 for the blend of this polyethylene with the lower density polyethylene wax, represents a particularly desirable composition in accordance with this invention, as will be evident from the above recited properties thereof, and those shown in Example 4.

When the proportions of the two polyethylenes are varied, by increasing the amount of polyethylene wax to about 25 parts by weight instead of 21.5 parts, less desirable results are obtained. Specifically such increase in the amount of wax ingredient produces a composition having greater tendency toward forming weld lines when extruded. Any large decreases in the proportion of polyethylene wax decrease the extrudability of the composition. Accordingly the limits of about 75 parts by weight high density polyethylene per 10–25 parts by weight of the polyethylene wax represent critical proportions of the components in accordance with this invention.

EXAMPLE 4

For production of a 3,250 pound batch, essentially the procedure of Example 3 was used as follows:

2470 lb. of 0.942 specific gravity polyethylene of Ivan Harris molecular weight of approximately 2 million and melt index not measurable by ASTM D–1238–52T was used. This polyethylene when tested for melt index by the above D–1238–52T procedure, modified to use a temperature of 590° F. (310° C.) and a weight of 27.5 lb. (12.475 kg.), had melt index of about 0.05 gram per 10 minutes. This polyethylene had melting point measured by disappearance of double refraction of about 135° C.

The above polyethylene in powder form, and 697 lb. of polyethylene wax as in Example 3, also in powder form, and antioxidant as in Example 3 were charged to a steam jacketed ribbon blender and heated and mixed at 105°–110° C. under nitrogen sweep gas for about 1 hour.

For purposes of deodorizing the blend, steam was then blown through for about 6 hours while mixing was continued at about 105°–110° C.

Pigment grade carbon black, 81 lb., was then added and mixed in under nitrogen for another 5 hours at 100° C.

The resulting composition was then cooled, while mixing continued under nitrogen, to about 30° C. The composition was discharged from the mixer and pelleted under nitrogen. The specific gravity of this composition at 25° C. was about 0.955, compared to 0.949 calculated from the values for the components. The composition had melt index, measured by the modified method above cited at 310° C. and with a 12.475 kg. weight, of about 0.1 gram per 10 minutes.

The pelleted composition was extruded into ½ inch and 1 inch pipe generally as in Example 3 but using lower pressures, in the range 1500–2000 p.s.i.g. at the die entrance. The resulting smooth, glossy pipe had the same excellent level of properties as did the pipe of Example 3.

In the foregoing, an Ivan Harris molecular weight of "approximately 2 million" is necessarily imprecise because of the high viscosities involved, and might be measured in duplicate tests anywhere between about 1 million and about 3 million. The expression "of the order of 1 million" is used to designate the order of magnitude, i.e. about 500,000–5,000,000.

We claim:

1. Process for forming a pelletizable powder composition of a normally solid, fusible alkane hydrocarbon, relatively fluid at and above its fusion temperature, with a difficultly extrudable polyethylene to produce a more readily extrudable polyethylene composition capable of forming a homogeneous blend upon being extruded in a screw extruder, said alkane hydrocarbon being relatively fluid at temperature in the range 100° C.–130° C. and having melt viscosity not above about 100 poises at 140° C., and said polyethylene having molecular weight of at least about 500,000 by the Ivan Harris formula and having melt index not above 0.1 as measured by the standard method ASTM D1238–52T; which process consists essentially in stirring said polyethylene in powdered form together with said relatively fluid alkane hydrocarbon in fused form in proportions of about 10–50 parts by weight of said relatively fluid alkane hydrocarbon per 100 parts by weight of high molecular weight polyethylene; and carrying out said stirring at temperatures not above about 130° C. and no higher than the temperature at which the mixture first visibly changes from powdery to lumpy; and continuing said stirring until the polyethylene powder has taken up substantially all of the fused relatively fluid alkane hydrocarbon between and upon the polymer particles, whereby upon allowing the composition to cool it retains essentially the form of a powder.

2. Process of claim 1, wherein the temperatures of mixing by stirring are in the range 100°–130° C.; the polyethylene has molecular weight of the order of 1,000,000; and the relatively fluid alkane hydrocarbon is chiefly a polyethylene wax of molecular weight defined by the Staudinger formula in the range 1500–3000.

3. Composition consisting essentially of a homogeneous blend of high density polyethylene of specific gravity at least 0.94 and melt index not above 0.1, with polyethylene wax of specific gravity about 0.92, Staudinger molecular weight in the range 1500–3000, melting point by ASTM Method D–87 in the range 97° C.–106° C., hardness in the range 0.1–0.5 mm. of penetration, and melt viscosity at 140° C. in the range 1.0 poises–25 poises; said polyethylene wax component being present in amounts of about 10–25 parts by weight per 75 parts by weight of said high density polyethylene component; and any other hydrocarbon material present not exceeding about 10 parts by weight; the final composition having abnormally high specific gravity, at least about 0.005 unit above that calculated from the specific gravities of the components.

4. Composition of claim 3, wherein the high density polyethylene component has a molecular weight, by the Ivan Harris formula, of about 1–3 million, melting point measured by disappearance of double refraction af about 135° C., and a specific gravity of about .94–.95; and wherein the polyethylene wax component has molecular weight, by the Staudinger formula, in the range between about 1500 and about 3000; melting point by ASTM Method D–87 in the range 97°–102° C.; penetration hardness in the range 0.3–0.5 mm.; and melt viscosity at 140° C. in the range of about 1.5 to about 2.5 poises; said composition, when in powder form, being directly pelletable.

5. Process for obtaining in pellet form a pipe compound consisting essentially of a homogeneous blend of (a) difficultly extrudable polyethylene of molecular weight at least about 500,000 by the Ivan Harris formula and having specific gravity in the range 0.94–0.95, melting point measured by disappearance of double refraction of about 135° C. and melt index not above 0.1 with (b) polyethylene wax of specific gravity about 0.92, Staudinger molecular weight in the range 1500–3000, melting point by ASTM Method D–87 in the range 97° C.–106° C., hardness in the range 0.1–0.5 mm. of penetration, and melt viscosity at 140° C. in the range 1.0 poise–25 poises which process consists essentially in: mixing about 75 parts by weight of said difficultly extrudable polyethylene in powder form with about 10–25 parts by weight of said polyethylene wax in fused form and with pigment grade carbon black at temperatures in the range between about 100° C. and about 130° C. and no higher than the temperature at which the mixture first visibly changes from powdery to lumpy; continuing said mixing until the ingredients are intimately mixed as shown by the mixture being a uniformly colored powder with all of the fused wax taken up between and upon the the polymer particles; and pelleting the resulting powder.

References Cited by the Examiner
UNITED STATES PATENTS

| | | | |
|---|---|---|---|
| 2,712,534 | 7/1955 | Erchak | 260—33.8 |
| 2,842,508 | 7/1958 | Sterk | 260—897 |
| 2,868,762 | 1/1959 | Oakes | 260—897 |
| 2,945,827 | 7/1960 | Henning | 117—100 |
| 2,983,704 | 5/1961 | Roedel | 260—897 |
| 3,030,322 | 4/1962 | Schrader | 260—28.5 |
| 3,061,882 | 11/1962 | Wolinski | 260—28.5 |

MURRAY TILLMAN, *Primary Examiner.*

D. ARNOLD, D. CZAJA, L. J. BERCOVITZ, *Examiners.*